(12) United States Patent
Ninomiya et al.

(10) Patent No.: US 7,053,136 B2
(45) Date of Patent: *May 30, 2006

(54) COLORED PARTICLE AQUEOUS DISPERSION, WATER-BASED INK, AND IMAGE FORMING METHOD

(75) Inventors: Hidetaka Ninomiya, Tokyo (JP); Hiroaki Ando, Tokyo (JP)

(73) Assignee: Konica Corporation, Tokyo (JP)

( * ) Notice: Subject to any disclaimer, the term of this patent is extended or adjusted under 35 U.S.C. 154(b) by 209 days.

This patent is subject to a terminal disclaimer.

(21) Appl. No.: 10/346,799

(22) Filed: Jan. 17, 2003

(65) Prior Publication Data

US 2003/0149131 A1 Aug. 7, 2003

(30) Foreign Application Priority Data

Jan. 31, 2002 (JP) .............................. 2002-023296

(51) Int. Cl.
*C08K 9/10* (2006.01)
*C09D 11/10* (2006.01)

(52) U.S. Cl. ...................................... 523/201; 523/160
(58) Field of Classification Search ................ 523/200, 523/201, 205, 206, 160, 161; 106/31.27
See application file for complete search history.

(56) References Cited

U.S. PATENT DOCUMENTS

| 5,837,754 A | 11/1998 | Shimomura et al. |
| 5,965,634 A | 10/1999 | Idogawa et al. |
| 6,031,024 A | 2/2000 | Uraki et al. |
| 6,777,463 B1 * | 8/2004 | Ando et al. .................. 523/160 |
| 6,825,247 B1 * | 11/2004 | Ando et al. .................. 523/160 |
| 6,841,591 B1 * | 1/2005 | Vincent et al. ............. 523/160 |
| 2002/0156154 A1 * | 10/2002 | Ando et al. .................. 523/161 |
| 2003/0008942 A1 * | 1/2003 | Ninomiya et al. .......... 523/160 |
| 2003/0055115 A1 * | 3/2003 | Ninomiya et al. ............ 516/77 |

FOREIGN PATENT DOCUMENTS

EP   1258511 A2 *   11/2002

OTHER PUBLICATIONS

Billmeyer, Jr. Fred W.; Textbook of Polymer Science 3rd Edition, John Wiley & Sons, New York, 1984 (pp. 152-153).*

* cited by examiner

*Primary Examiner*—Callie Shosho
(74) *Attorney, Agent, or Firm*—Frishauf, Holtz, Goodman & Chick, P.C.

(57) ABSTRACT

A colored particle aqueous dispersion and a water based ink containing the dispersion are disclosed, the colored particle aqueous dispersion containing colored particles comprising a colorant and a resin, wherein the difference in solubility parameter (SP) between the colorant and the resin is not more than $4.0\ (\text{J/cm}^3)^{1/2}$.

15 Claims, No Drawings

COLORED PARTICLE AQUEOUS DISPERSION, WATER-BASED INK, AND IMAGE FORMING METHOD

FIELD OF THE INVENTION

The present invention relates to a water-based ink for ink-jet printing, a colored particle aqueous dispersion used in the water-based ink, and an image forming method employing the water-based ink.

BACKGROUND OF THE INVENTION

In recent years, elimination of solvents and use of water-based constitution have been demanded in the field of recording materials and an inking material utilized for printers, printing machines, markers and writing tools. Especially, there have been widely used recording materials comprising mainly an aqueous solution of a water-soluble dye and those comprising mainly a fine particle dispersion of a pigment for a water-based ink of ink-jet recording.

In a water-based ink comprising a water-soluble dye, there is used an aqueous solution of a water-soluble dye selected from the group of dyes that are categorized mainly into acid dyes, direct dyes and some food dyes. To the aqueous solution is added a glycol or an alkanolamine as a wetting agent, a surfactant or an alcohol to adjust the surface tension, thickeners and other agents according to need. The water-based inks using water-soluble dyes are most commonly used because of their high reliability of anti-clogging at pen tips or in a printer. The water-based inks using water-soluble dyes, however, easily cause blotting on recording paper because they comprise an aqueous solution of dyes. Therefore, they have only limited uses and their print quality tends to be deteriorated due to blotting of the ink. In addition, water-soluble dyes, which only permeate into a recording paper sheet and are then dried to adhere to the recording paper sheet, is hardly considered to be "dyed". Thus, light fastness of such water-based inks is extremely low.

Further, in order to solve problems of low water resistance and low light fastness of the water-based inks utilizing the water soluble dyes, proposals of coloring water-dispersible resins with an oil soluble dye or a hydrophobic dye have been made, for example, in JP-A No. 55-139471 (the term, JP-A refers to an unexamined and published Japanese Patent Application), JP-A No. 58-45272, JP-A No. 3-250069, JP-A No. 8-253720, JP-A No. 8-92513, JP-A No. 8-183920 and JP-A No. 2001-11347.

Proposals have been made of not only dyeing a water dispersible resin with an oil soluble dye or a hydrophobic dye but also utilizing colored particles comprising a colorant and a resin that is coated with the colorant, and also utilizing colored particles comprised of a colorant and a resin the surface of which are further coated with a film-forming resin.

On the other hand, in a pigment ink comprising mainly fine particle dispersion of a pigment, disclosed have been several proposals of coating the surface of a pigment with a film-forming resin in order to overcome problems of low density or poor color reproduction quality due to bronzing, and further, to improve light fastness, dispersion stability and discharge stability. Examples of coating a pigment with a resin are described in JP-A No. 8-269374, JP-A No. 9-151342, JP-A No. 10-88045 and JP-A No. 10-292143.

In many cases when a dispersion of first particles comprising a water dispersible resin dyed with these oil soluble dyes or hydrophobic dyes, second particles in which fine particles of a colorant such as a dye or a pigment are mixed with a resin, or third particles in which the first or second particles are further covered with another resin is prepared, a stable particle dispersion containing the colorant in a high concentration cannot be obtained due to insufficient solubility or affinity of the colorant or the resin to an organic solvent. The colorant dissolved or dispersed in a solvent is likely to precipitate, the resin is difficult to be mixed with the colorant, or the colorant is localized on the particle surface (the colorant is not covered with the resin), and therefore, ink for ink jet printing cannot be obtained which provides an image with high density. Further, in such particles, there are problems in that the effect to improve light fastness is decreased, and properties such as dispersion stability and ink jetting stability, which are needed for ink utilized for ink-jet printing.

SUMMARY OF THE INVENTION

An object of the present invention is to provide a water-based ink for ink-jet printing providing high storage stability, high ink jetting stability, a high image density, and high light fastness, and to provide a colored particle aqueous dispersion for preparing the water-based ink. Another object of the present invention is to provide an image forming method employing the water-based ink for ink-jet printing.

The above object of the present invention can be accomplished by the following embodiments.

1. A colored particle aqueous dispersion containing colored particles comprising a colorant and a resin, wherein the difference in solubility parameter (SP) between the colorant and the resin is not more than 4.0 $(J/cm^3)^{1/2}$.

2. The colored particle aqueous dispersion of item 1 above, wherein the colored particles are core/shell colored particles in which the colorant and the resin form a core, and a shell polymer encapsulates the core, and the colorant is a dye.

3. The colored particle aqueous dispersion of item 2 above, wherein log P of the dye is not less than 2.0 higher than log P of the resin or the shell polymer, the log P being defined by the following formula:

$$\log P = \log So/Sw$$

wherein So represents solubility in 25° C. n-octanol of material to be measured, and Sw represents solubility in 25° C. water of material to be measured.

4. The colored particle aqueous dispersion of item 3 above, wherein log P of the dye is not more than 15 higher than log P of the resin or the shell polymer.

5. The colored particle aqueous dispersion of item 4 above, wherein log P of the dye is 2.0 to 10 higher than log P of the resin or the shell polymer.

6. The colored particle aqueous dispersion of item 2 above, wherein log P of the shell polymer is not less than 1.0 higher than log P of the resin, the log P being defined by the following formula:

$$\log P = \log So/Sw$$

wherein So represents solubility in 25° C. n-octanol of material to be measured, and Sw represents solubility in 25° C. water of material to be measured.

7. The colored particle aqueous dispersion of item 6 above, wherein log P of the shell polymer is less than 5.0 higher than log P of the resin.

8. The colored particle aqueous dispersion of item 7 above, wherein log P of the shell polymer is 1.0 to 3.0 higher than log P of the resin.

9. A water-based ink containing a colored particle aqueous dispersion, wherein the dispersion contains colored particles comprising a colorant and a resin, and wherein the difference in solubility parameter (SP) between the colorant and the resin is not more than 4.0 $(J/cm^3)^{1/2}$.

10. The water-based ink of item 9 above, wherein the colored particles are core/shell colored particles in which the colorant and the resin form a core, and a shell polymer encapsulates the core, and the colorant is a dye.

11. The water-based ink of item 10 above, wherein log P of the dye is not less than 2.0 higher than log P of the resin or the shell polymer, the log P being defined by the following formula:

$$\log P = \log So/Sw$$

wherein So represents solubility in 25° C. n-octanol of material to be measured, and Sw represents solubility in 25° C. water of material to be measured.

12. The water-based ink of item 11 above, wherein log P of the dye is not more than 15 higher than log P of the resin or the shell polymer.

13. The water-based ink of item 12 above, wherein log P of the dye is 2.0 to 10 higher than log P of the resin or the shell polymer.

14. The water-based ink of item 10 above, wherein log P of the shell polymer is not less than 1.0 higher than log P of the resin, the log P being defined by the following formula:

$$\log P = \log So/Sw$$

wherein So represents solubility in 25° C. n-octanol of material to be measured, and Sw represents solubility in 25° C. water of material to be measured.

15. The water-based ink of item 14 above, wherein log P of the shell polymer is less than 5.0 higher than log P of the resin.

16. The water-based ink of item 15 above, wherein log P of the shell polymer is 1.0 to 3.0 higher than log P of the resin.

17. The water-based ink of item 9 above, wherein the colored particles have an average particle diameter of not more than 100 nm.

18. The water-based ink of item 9 above, wherein the water-based ink is ink for ink jet printing.

19. An image formation method comprising the steps of ejecting droplets of a water-based ink from an ink-jet head based on digital signals, and adhering the ejected droplets onto an ink receiving material, the water based ink containing a colored particle aqueous dispersion containing colored particles comprising a colorant and a resin, wherein the difference in solubility parameter (SP) between the colorant and the resin is not more than 4.0 $(J/cm^3)^{1/2}$.

101. A colored particle aqueous dispersion comprising colored particles containing a colorant and a resin, wherein the difference in solubility parameter (SP) between the colorant and the resin is not more than 4.0 $(J/cm^3)^{1/2}$.

102. The colored particle aqueous dispersion of item 101 above, wherein the colorant contained in the colored particles is a dye, and the colored particles form cores and the cores are coated with a shell polymer forming a shell to form a core/shell structure.

103. The colored particle aqueous dispersion of item 102 above, wherein log P of the dye is not less than 2.0 higher than log P of the resin or shell polymer.

104. The colored particle aqueous dispersion of item 102 or 103 above, wherein log P of the shell polymer is not less than 1.0 higher than log P of the resin contained in the colored particles.

105. A water-based ink, wherein the water-based ink comprises the colored particle aqueous dispersion of any one of items 101 through 104 above.

106. The water-based ink of item 105 above, wherein the colored particles have an average particle diameter of not more than 100 nm.

107. The water-based ink of item 105 or 106 above, wherein the water-based ink is ink for ink jet printing.

108. An image formation method comprising the steps of ejecting droplets of the water-based ink of item 106 from an ink-jet head based on digital signals, and adhering the ejected droplets onto an ink receiving material.

In order to obtain characteristics in an ink that provides high ink image density or high ink jetting stability employing a water-based ink comprising an aqueous dispersion comprising colored particles containing a colorant and a resin, high compatibility between the colorant and all or part of the resin is required in mixing the colorant, the resin and optionally, an organic solvent. There has been no information about physical properties between a colorant and a resin contained in colored particles. It has been found that solubility parameter (SP) and log P are important to obtain stable colored particles. The SP determines wettability or compatibility between the materials, while the log P determines solubility of materials or the ease with which a material permeates the colored particles or a material is distributed on the surface of the colored particles. When these values are optimized, a colorant does not easily precipitate in the dispersion containing the colorant, and particles comprising colored particles as a core and a shell encapsulating the core can be stably dispersed in the dispersion. Ink comprising such a dispersion provides high printing density and excellent ink jetting property.

In the invention, in order to obtain a colored particle aqueous dispersion in which colored particles containing a colorant and a resin uniformly mixed, the whole or part of them exhibiting high compatibility, are dispersed in an aqueous medium, the difference in SP between the colorant and the resin is required to be not more than 4.0 $(J/cm^3)^{1/2}$.

An aqueous dispersion (hereinafter referred to also as a colored particle aqueous dispersion) comprising colored particles containing a colorant and a resin, which are uniformly mixed, is formed, for example, dissolving or dispersing the colorant and the resin in an organic solvent to obtain a solution or a dispersion, and then dispersing the resulting solution or dispersion in an aqueous medium. In many cases, when affinity of a colorant to a resin is insufficient, colored particles having a high concentration of the colorant cannot be prepared. For example, when a resin and a dye as a colorant are dissolved in an organic solvent to obtain a solution, and a colored particle aqueous dispersion is prepared employing the resulting solution, the dye is likely to be separated from the resin and precipitated in the dispersion after formation of colored particles. When colored particles are prepared employing a resin and a pigment as a colorant, if affinity of the pigment to the resin is low, agglomeration of the pigment is likely to occur due to interaction between the pigment, mixing of the resin and pigment is not uniform, and coverage of the colorant with the resin is insufficient. In such a case, uniform colored particles with high dispersing stability are difficult to obtain.

The present inventors have found that a stable colored particle dispersion in which a colorant and a resin are uniformly mixed can be prepared selecting a resin and a colorant in which the difference in SP between the colorant and the resin is not more than 4.0 $(J/cm^3)^{1/2}$, and preferably not more than 2.0 $(J/cm^3)^{1/2}$, and employing them. Uniform colored particles are preferable in obtaining good color tone.

In the invention, the colored particles in the colored particle aqueous dispersion preferably have a core/shell structure in which the resin and the colorant form a core and the core is encapsulated by a polymer (a shell polymer) for a shell. The core/shell structure provides a colored particle aqueous dispersion with good stability, and an ink, comprising the colored particle aqueous dispersion having such a core/shell structure, provides high ink jetting stability, and a printing image with good color tone, high density and high light fastness.

The colorant used in the invention is preferably a dye, which is capable of being uniformly dissolved in a resin, and the log P of the dye is preferably not less than 2.0 higher than that of a resin which constitutes cores of colored particles together with the dye or that of a shell polymer encapsulating the cores. Such a dye is likely to permeate the inside of the colored particles in an aqueous medium, and is not deposited on the surface of the particles. Therefore, the dye provides stable colored particles and stable colored particle aqueous dispersion. The log P of the dye is more preferably not more than 15.0 lower than that of a resin which constitutes cores of colored particles together with the dye or that of a shell polymer encapsulating the cores. It is still more preferable that the log P of the dye is 2.0 to 10.0 lower than that of the resin or the shell polymer. The above range of the log P difference is preferred in view of dispersion stability of the colored particles, printed image density, light fastness, or affinity of the dye to the resin or the solvent.

In the invention, when the log P of the resin contained in the colored particles is compared with that of the shell polymer, the log P of the shell polymer is not less than 1.0 higher than and not more than 5.0 lower than, the log P of the resin. It is preferred that the difference in the log P between the shell polymer and the resin is in the range of 1.0 to 3.0. The above range of the difference is preferred in view of uniform formation of the shell.

The aqueous medium used in the colored particle aqueous dispersion of the invention refers to a liquid medium containing water as a main solvent. The aqueous medium contains water in an amount of preferably not less than 50% by weight, and preferably not less than 70% by weight. The aqueous medium may contain an organic solvent such as an alcohol or a polyhydric alcohol, and is most preferably water.

To the colored particle aqueous dispersion comprising colored particles in which the colorant is incorporated in the resin, conventional additives, for example, wetting agents such as polyhydric alcohols, inorganic salts, surfactants, antiseptic agents, antifungal agents, pH adjusting agents, antifoaming agents such as silicone compounds, viscosity adjusting agents, chelating agents such as EDTA, or oxygen absorbents such as sulfites are optionally added. Thus, the water-based ink of the invention is prepared.

The difference in a solubility parameter (hereinafter referred to also as SP) between a resin and a colorant (preferably a dye) contained in the colored particle aqueous dispersion of the invention is not more than 4.0 $(J/cm^3)^{1/2}$, whereby compatibility between the resin and the colorant is increased, and the colorant concentration in the colored particles can be increased.

The solubility parameter will be explained in detail below.

The solubility parameter, which is used in evaluating solubility of a non-electrolyte in an organic solvent, is a value obtained from Hilderbrand's solubility parameter. The solubility parameter is described in J. H. Hilderbrand, J. M. Prausnitz, R. L. Scott, "Regular and Related Solutions", Van Nostrand-Reinhold, Princeton (1970), or "Kobunshi Data Handbook (Kisohen)" edited by Kobunshi Gakkai. The solubility parameters of various solvents are described in A. F. M. Baron, "Handbook of Solubility Parameters and Other Cohesion Parameters", CRC Press, Boca Raton/Fla. (1983) or "Kobunshi Data Handbook (Kisohen)" edited by Kobunshi Gakkai.

The solubility parameter SP of materials is defined by the following formula:

$$SP=(\delta E/V)^{1/2}$$

wherein δE represents cohesion energy per mole, and V represents mole volume.

The solubility parameter can be obtained according to several methods such as a solubility method, a vaporization heat method, a vapor pressure method, a wetting method, a surface tension method, a heat expansion coefficient method, and a refractive index method.

In the invention is used a solubility parameter obtained according to any one of the following methods. In the invention, unit of the solubility parameter is $(J/cm^3)^{1/2}$.

The solubility parameter of materials can be obtained from solubility of the materials in various solvents having a known SP. This method is effective in obtaining an SP of colorants or resins the chemical structure of which is unknown.

A material is dissolved in various organic solvents whose SP is known, for example, ethanol, acetone, methyl ethyl ketone, and ethyl acetate, and the SP of the material is determined from the SP of the solvents having higher solubility of the material. SP has, as its components, δd (a dispersion force term), δp (a polarity term), and δh (a hydrogen bond term). Each term is plotted with respect to solvents having higher solubility of the material, and the average of each term is obtained. Employing the average, the SP of the material (unknown) can be obtained. (See C. M. Hansen, J. Paint Technol., 39(505) 104 (1967), or C. M. Hansen, J. Paint Technol., 39(511) 505 (1967).)

It is difficult to obtain the SP of materials having a low solubility in a solvent according to a solubility method. A method is described in the literatures described above which determines the SP of such materials employing a suspension method. A solvent having an SP closer to that of a material has higher wettability to the material. A material (for example, pigment or resin) to determine its SP is mixed with a solvent while stirring to obtain a suspension. Solvents (plural solvents) providing a good suspensibility are selected from solvents whose SP is known, for example, ethanol, acetone, methyl ethyl ketone, and ethyl acetate, and δd (a dispersion force term), δp (a polarity term), and δh (a hydrogen bond term) of each of the selected solvents are plotted, and the average of each term is obtained. Setting the resulting average equal to each term of the SP of the material, the SP of the material (for example, a pigment) can be obtained.

The solubility parameter of a material can be determined by calculation, when the chemical structure of the material is known. Considering a chemical composition and an SP of a material, Small proposed a calculation method of determining the SP by dividing the sum of molar gravitation constant ΔF of the molecule by a molar volume V. In this method, ΔF can be assigned to each atomic group in the molecule, and the calculation is easily carried out.

$$S=(S\Delta F)/V$$

However, the Small method only comprises cohesive energy generated from dispersion force. In order to increase the calculation accuracy, Rheinneck, Hoy, Krevelen, and Fedors et al. proposed a different amended ΔF. Hansen proposed parameters divided into three dimensions. The SP calculated from each proposal above also varies slightly, but when calculating the difference in SP between materials in the invention employing the SP calculated above, the error is extremely small. When the chemical structure of a material is known, the SP of the material can be calculated employing the amended parameter described above. A calculation program used in the invention is a Project Leader in a molecular calculation package, so-called CAChe by Fujitu Co., Ltd.

In the invention, the solubility parameter determined according to any one of the methods described above is used, but the solubility parameter of a solvent may slightly vary due to methods determining the SP. When the solubility parameter of a material is determined from its solubility to the solvent, employing such a solvent solubility parameter, it also varies in accordance with variation of the solvent solubility parameter. However, the difference of the solubility parameter determined is not so large. With respect to the difference in SP between different materials, the minimum difference is adopted.

When the chemical structure of a dye or a pigment as a colorant or a resin is known, the SP is determined preferably according to the calculation method described above. In the invention, the difference in a solubility parameter between a resin and a colorant contained in the colored particle aqueous dispersion is not more than 4.0 $(J/cm^3)^{1/2}$, which provides high affinity and compatibility between the resin and the colorant, resulting in uniform dispersion of the colorant in the resin.

The log P will be explained below.

In the invention, the difference in log P between a resin and a high boiling point solvent used, or between a resin and a dye preferably used as a colorant is important. When a core/shell structure is formed, in which the core is comprised of a dye and a resin, and the shell encapsulating the core is comprised of a shell polymer, the difference in log P between the dye and the shell polymer or between the resin and the shell polymer is also important. The log P is a parameter representing hydrophilicity or hydrophobicity of a material. As its numerical value increases, hydrophobicity rises, and as its numerical value decreases, hydrophilicity rises. The log P is a well known parameter of materials, and can be obtained from measurement or calculation.

The calculated log P described later is not completely identical to distribution coefficient of a material defined by formula below when the material is distributed into two solvents, n-octanol and water. There may be a slight difference between the calculated value and the measured value. However, such a difference of log P, if any, is not so large, and the log P determined can sufficiently show properties of the material. With respect to the difference in log P between different materials the minimum difference is adopted. In contrast, different materials or even resins, which apparently differ in the macroscopic or microscopic properties, may have the same value of log P.

The term, log P in the invention is a parameter showing hydrophobicity or hydrophilicity of a material, and can be determined from distribution coefficient of the material defined by formula below, when the material is distributed to n-octanol and water.

$$\log P = \log So/Sw$$

wherein So represents solubility in 25° C. n-octanol of material to be measured, and Sw represents solubility in 25° C. water of material to be measured.

This is detailed in "Yakubutu no Kozoukasseisoukan" of "Kagaku no Ryouiki" (published by Nanko do), 122, pages 73 to 103.

In recent years, a method has been proposed which determines logp by calculation. Further, there have been proposed various methods such as a method employing a molecular orbital method, a fragment method basically employing the Hansch data, and a method according to HPLC.

In the invention, a program for calculating the log P basically employs a fragment method in A. K. Ghosat et al., J. Comput. Chem., 8:80 (1988), which is Project Leader in a molecular calculation package, so-called CAChe by Fujitu Co., Ltd.

When the log P is obtained according to calculation, the calculated log P is preferably used.

In the invention, in order to prepare an aqueous dispersion of colored particles comprising a dye and a resin or an aqueous dispersion of particles having a core/shell structure in which the core is comprised of a resin and a colorant, and the shell encapsulating the core is comprised of a shell polymer, those having the relationship described above are used. The colorant, the resin, the shell polymer and monomers for preparing the shell polymer, each being used in the invention, will be explained below.

The resin (polymer) employed in the invention will be explained below. The number average molecular weight of resin (polymer) employed in the invention is preferably from 500 to 100,000, and is more preferably from 1,000 to 30,000, from the viewpoint of layer forming properties after printing, durability, and dispersibility.

The Tg of the polymer is not particularly limited. However, it is preferable to use at least one polymer having a Tg of at least 10° C.

In the present invention, the commonly known resins (polymers) may be employed, but preferred polymers include a polymer having an acetal group as a major functional group, a polymer having a carbonic acid ester group, a polymer having a hydroxyl group, and a polymer having an ester group. The polymer having an acetal group is especially preferable, and polyvinyl butyral is most preferable.

The polymers may have a substituent which may be comprised of a straight chain, a branched chain, or a cyclic structure. Various types of the polymers having a functional group are commercially available, but may be synthesized using conventional methods. Further, copolymers of these can be obtained as follows. For example, an epoxy group is introduced into one polymer molecule, and subsequently, the resultant polymer undergoes condensation polymerization with other polymers. The copolymers can also be obtained by carrying out graft polymerization utilizing light as well as radioactive rays.

A polymer prepared by radical polymerization of vinyl monomers having a polymerizable ethylenically unsaturated bond is also preferably used. Examples of the polymer include a polymer prepared by radical polymerization of ethylene, propylene, butadiene, vinyl chloride, vinylidene chloride, vinyl acetate, styrene, (meth)acrylate, meth(acrylic acid, or acryl amide, a copolymer such as a styrene-ethyl acrylate copolymer or a styrene-butyl acrylate copolymer, a copolymer such as a styrene-ethylhexyl methacrylate copolymer, and a copolymer such as a styrene-ethylhexyl methacrylate-hydroxyethyl acrylate copolymer.

In the invention, a polymer (polyvinyl acetal) having an acetal group is especially preferable, and polyvinyl butyral is most preferable in view of its solubility or affinity to a colorant such as a dye or a pigment. When plural resins are employed in the invention, it is preferred that one of the resins is polyvinyl butyral and others are one or more polymers described above.

The colored particle aqueous dispersion of the invention can be obtained by a method of dissolving (or dispersing) the resin (plural resins may be used) and colorant (the pigment, or preferably the dye is used) as described above in an organic solvent, emulsion dispersing the resulting solution or dispersion in water, and then removing the organic solvent. The colored particle aqueous dispersion can be also obtained by various methods, for example, a method of preparing a resin particles dispersion by emulsion polymerization, adding a dye solution in which the dye is dissolved in an organic solvent to the dispersion so that the resin particles are impregnated with the dye. The colored particle aqueous dispersion satisfying the relationship described above provides high color density and high dispersion stability.

Such a colored particle aqueous dispersion of color particles containing a resin and a colorant provides less coagulation and high dispersion stability, and is advantageously used for preparing an ink jet ink containing colored particles. In order to further prevent coagulation of the colored particle aqueous dispersion for a long term, to improve dispersion stability of ink containing the dispersion, and to provide ink image with high color tone, good glossiness, and high fastness such as light fastness, the colored particles as cores are preferably coated with a polymer shell comprised of an organic polymer (hereinafter referred to as a shell polymer) to form a shell.

As a method of forming a shell, a polymer solution in which the polymer is dissolved in an organic solvent is added to colored particles so that the polymer is adsorbed on the surface of the colored particles as cores. In the invention, a method is preferred which prepares colored particles, containing a colorant and two or more kinds of resins, which form cores, adding a monomer having a polymerizable double bond to the colored particles, and emulsion polymerizing the monomer in the presence of a surfactant to adsorb the produced shell polymer on the colored particles and form a polymer shell on the cores. For example, when a dye is used as a colorant in this method, various phases are mixed at the interface between the cores and shell, and therefore, the dye content of the shell is not necessarily zero. However, the dye content of the shell is preferably less. The colorant content of the shell is preferably not more than 0.8 times that of the cores before the shell is formed, and more preferably not more than 0.5 that of the cores before the shell is formed.

Examples of the monomer having a polymerizable double bond for forming a polymer shell include ethylene, propylene, butadiene, vinyl chloride, vinylidene chloride, vinyl acetate, styrene, (meth)acrylate, meth(acrylic acid, or acryl amide. The monomer is preferably styrene, or (meth)acrylate such as ethyl meth(acrylate), butyl meth(acrylate), or ethylhexyl meth(acrylate). A polymerizable monomer having a hydroxy group in the molecule such as a hydroxyalkyl meth(acrylate), typically, hydroxyethyl (meth)acryrate is preferably used in an amount of at maximum 50% by weight, based on the total weight of monomers for forming a shell together with another monomer. Further, in order to increase stability of a shell, an ethylenically unsaturated monomer having a group with a pKa of from 3 to 7, for example, a carboxyl group-containing monomer such as acrylic acid or methacrylic acid or a sulfonic acid group-containing monomer may be used in an amount of not more than 10% by weight, and in an amount less than that of the aforementioned monomer having a hydroxy group, based on the total monomer weight. It is desirable to use the aforementioned monomer having a hydroxy group in the molecule for forming a shell. In the invention, a resin for forming cores and a shell polymer for forming a shell are preferably selected so that the difference in log P between the resin and the shell polymer satisfy the relationship described above, whereby the colored particle aqueous dispersion containing the core/shell colored particles having high dispersion stability is stably prepared.

(Evaluation of Core-Shell Formation)

It is important to evaluate practical core-shell formation. In the present invention, since the diameter of each particle is markedly small, to such a degree of less than or equal to 200 nm, analytical methods are limited from the viewpoint of resolution. Employed as analytical methods, which achieve the purposes, may be TEM and TOF-SIMS. When fine core-shell particles are observed utilizing TEM, a dispersion is applied onto a film comprised of carbon and subsequently dried, whereby the resultant coating may be observed. When an image observed utilizing the TEM is an image of only an organic material, the image is low in contrast. Therefore, in order to identify core-shell formation, it is desirable to dye the particles employing osmium tetroxide, ruthenium tetroxide, chlorsulfonic acid/uranyl acetate, or silver sulfide. Only core particles are dyed and the resultant particles are observed utilizing said TEM and compared to shell particles. Further, shell particles and non-shell particles are blended and subsequently dyed. It is then confirmed that the ratio of particles having a different degree of dying corresponds to the presence and absence of shell particles.

In a mass spectrometer such as TOF-SIMS, it is confirmed that by forming a shell on the surface of particles, the amount of colorants adjacent to the surface decreases compared to the formation of the core alone. When the colorants do not contain an element which is contained in a core-shell polymer, it is possible to confirm the formation of the shell containing a lesser amount of colorants utilizing the element as a probe.

When no such element is available, it is possible to compare the content of the colorants in the shell to that of particles having no shell, employing a suitable dyeing agent. The core-shell formation can more clearly be observed in such a manner that core-shell particles are buried into an epoxy resin, and an ultra-thin slice is cut employing a microtome, followed by dying the resultant slice. When polymers or colorants comprise an element which is employed as a probe, it is possible to estimate core-shell compositions as well as the amount of the colorants distributed in the core as well as in the shell, employing TOF-SIMS or TEM.

It is important to optimize the recipe and to select a suitable emulsifying method in order to obtain the desired particle diameter of the colored particles in the colored particle aqueous dispersion of the invention. The recipe varies depending on a colorant, a resin or a shell polymer used, but it is preferred that a shell polymer constituting a shell is more hydrophilic than a resin constituting a core because they constitute a suspension in water. The amount of the colorant contained in the shell polymer constituting the shell is preferably less than that in the resin constituting the core, and the colorant is preferably less hydrophilic than a shell polymer constituting a shell. Hydrophilicity and hydrophobicity, for example, can be estimated by using the solubility parameter (SP) described above.

In the present invention, since colorant-containing core-shell colored fine particles used in a polymer emulsion type water-based ink have a very large surface area per unit volume when the volume average particle diameter is less than 5 nm, the effect of incorporating a colorant in a core-shell polymer is decreased. On the other hand, particles having a particle diameter of over 200 nm tend to clog the printing head, as well as to precipitate in ink, causing the storage stability of the ink to deteriorate. Consequently, the average particle diameter of the colored particles is preferably 5 to 400 nm, and more preferably 10 to 150 nm. When the average particle diameter exceeds 150 nm, it causes deterioration of glossiness of images recorded on a glossy medium or deterioration of transparency with images recorded on a transparent medium. Further, when the average particle diameter of the colored particles is less than 10 nm, dispersion stability of the colored particles tends to be lowered and storage stability of ink is easily deteriorated. Thus, the average particle diameter of the colored particles is most preferably 10 to 100 nm.

A volume average particle diameter can be determined by spherical conversion of a circular equivalent particle diameter obtained from the value of projected areas (for at least 100 particles) in a transmission type electron micrograph (TEM). A volume average particle diameter and its standard deviation are thus determined and a variation coefficient is calculated by dividing the standard deviation by the volume average particle diameter. A variation coefficient can also be determined by use of a dynamic light scattering method. Examples of measuring apparatus are: a laser particle analyzing system manufactured by OTSUKA ELECTRONICS CO., LTD; and Zetasizer manufactured by MALVERN Instruments Ltd.

A variation coefficient of particle diameter is the value of a standard deviation of particle diameter divided by a particle diameter, which means that the larger this value, the wider is the distribution of particle diameters. When the variation coefficient of a volume particle diameter is at least 80%, the distribution of particle diameter becomes very broad, so that the thickness of a core-shell tends to be non-homogeneous and the physical surface properties tend to vary among particles. The variation of the physical surface properties easily causes coagulation of particles which often results in clogging of ink-jet heads. Further, coagulation of particles easily causes light scattering of the colorant on a medium, resulting in deterioration of image quality. The variation coefficient is preferably not more than 50% and is more preferably not more than 30%.

In the present invention, the content of the shell polymer used for a shell is preferably 5 to 95% by weight of the total weight of the shell polymer and resin. When it is less than 5% by weight the thickness of a shell is insufficient so that a portion of a core containing a large amount of colorant easily appears on the particles' surface. Further, when the polymer in a shell is excessive, it easily causes reduced ability to protect the colorant in the core. Thus it is more preferably 10 to 90% by weight.

The total content of a colorant such as a dye or a pigment is preferably from 20 to 1,000% by weight of the total weight of the shell polymer and resin used. When the content of colorant is too low compared to the polymer, the image density is insufficiently high after ink-jet recording, while when the content of the colorant is too large, the protection capability of the polymer is insufficient.

In the invention, the colorant used according to the solubility parameter described above can be selected from the colorants described below. The colorant is selected considering kinds of resin used together with the colorant to constitute colored particles or kinds of a shell polymer encapsulating the colored particles as cores.

Hue of the colorant in the present invention is commonly yellow, magenta, cyan, black, blue, green and red, and is preferably yellow, magenta, cyan and black. An oil soluble dye is generally a dye, which does not have a water solubilizing group such as a carboxyl or sulfonyl group, and which is soluble in organic solvents and insoluble in water. The oil soluble dyes also include a water soluble dye made oil-soluble due to its salt formation with a long chain alkyl base. For example, known is a salt formation dye which is a dye salt of an acid dye, a direct dye or a reactive dye with a long chain alkyl amine.

Oil soluble dyes are not limited to those described below. Preferred examples of the oil soluble dyes include the following:

Valifast Yellow 4120, Valifast Yellow 3150, Valifast Yellow 3108, Valifast Yellow 2310N, Valifast Yellow 1101, Valifast Red 3320, Valifast Red 3304, Valifast Red 1306, Valifast Blue 2610, Valifast Blue 2606, Valifast Blue 1603, Oil Yellow GG-S, Oil Yellow 3G, Oil Yellow 129, Oil Yellow 107, Oil Yellow 105, Oil Scarlet 308, Oil Red RR, Oil Red OG, Oil Red 5B, Oil Pink 312, Oil Blue BOS, Oil Blue 613, Oil Blue 2N, Oil Black BY, Oil Black BS, Oil Black 860, Oil Black 5970, Oil Black 5906, and Oil Black 5905, each manufactured by Orient Chemical Industries, Ltd.

Kayaset Yellow SF-G, Kayaset Yellow K-CL, Kayaset Yellow GN, Kayaset Yellow A-G, Kayaset Yellow 2G, Kayaset Red SF-4G, Kayaset Red K-BL, Kayaset Red A-BR, Kayaset Magenta 312, and Kayaset Blue K-FL, each manufactured by NIPPON KAYAKU CO., LTD.

FS Yellow 1015, FS Magenta 1404, FS Cyan 1522, FS Blue 1504, C.I. Solvent Yellow 88, 83, 82, 79, 56, 29, 19, 16, 14, 04, 03, 02, 01; C.I. Solvent Red 84:1, C.I. Solvent Red 84, 218, 132, 73, 72, 51, 43, 27, 24, 18, 01; C.I. Solvent Blue 70, 67, 44, 40, 35, 11, 02, 01; C.I. Solvent Black 43, 70, 34, 29, 27, 22, 7, 3; C.I. Solvent Violet 3, C.I. Solvent Green 3 and C.I. Solvent Green 5, each manufactured by ARIMOTO CHEMICAL CO., LTD.

Further, metal complex dyes such as described in JP-A 9-277693, 10-20559 and 10-30061 are also acceptable. For example, dyes represented by Formula (1) can be employed.

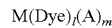

M(Dye)$_l$(A)$_m$            Formula (1)

In Formula (1), M represents a metal ion, the term Dye represents a dye capable of forming a coordination bond with a metal ion, and A represents a ligand except for a dye. "l" represents 1, 2 or 3, and "m" represents 0, 1, 2 or 3. When "m" is 0 (zero), "l" represents 2 or 3, and in this case, Dye may be same or different.

The metal ions represented by M are ions of metals selected from the Groups 1 through 8 of the Periodic Table. Example metal ions are; Al, Co, Cr, Cu, Fe, Mn, Mo, Ni, Sn, Ti, Pt, Pd, Zr and Zn. Ions of Ni, CU, Cr, Co, Zn, and Fe are preferable in terms of color tone and various kinds of durability, and Ni ion is specifically preferable.

The dyes capable of forming a coordination bond with a metal ion, represented by the term Dye, include dyes having various dye structures, and preferably are dyes having a coordination group in a structure of a conjugated methine dye, an azo methine dye and an azo dye.

A disperse dye can be used as the oil soluble dye, and disperse dyes are not limited to those described below. Preferred examples of the disperse dyes include dyes such as C.I. Disperse Yellow 5, 42, 54, 64, 79, 82, 83, 93, 99, 100, 119, 122, 124, 126, 160, 184:1, 186, 198, 199, 204, 224 and 237; C.I. Disperse Orange 13, 29, 31:1, 33, 49, 54, 55, 66, 73, 118, 119 and 163; C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; and C.I. Disperse Green 6:1 and 9.

Other preferred oil soluble dyes include cyclic methylene compounds of phenols, naphthols, pyrazolones, or pyrazolotriazoles, azomethine dyes which can be obtained by oxidation coupling so-called couplers such as open chain methylene compounds with amino compounds such as p-phenylene diamines or p-diaminopyridines, and indoaniline dyes. Azomethine dyes having a pyrazolotriazole ring are especially preferable as a magenta dye.

Pigments are not limited by the following, however, specifically preferable examples of carbon black are listed below.

Mitsubishi Kasei Corp.: No. 2300, No. 900, MCF-88, No. 33, No. 40, No. 45, No. 52, MA7, MA8, MA100, and No.2200B.

Columbia Corp.: Raven 700, Raven 5750, Raven 5250, Raven 5000, Raven 3500, and Raven 1255.

Cabot Corp.: Regal 400R, Regal 330R, Regal 660R, Mogul L, Monarch 700, Monarch 800, Monarch 880, Monarch 900, Monarch 1000, Monarch 1100, Monarch 1300, and Monarch 1400.

Degussa AG: Color Black FW1, Color Black FW2, Color Black FE2V, Color Black FW18, Color Black FW20, Color Black S150, Color Black S160, Color Black S170, Printex 35, Printex U, Printex V, Printex 140U, Printex 140V, Special Black 6, Special Black 5, Special Blach 4A, and Special Black 4.

The Kansai Coke and Chemicals Co., Ltd.: Maxsoab G-40, Maxsoab G-15, and Maxsoab G-08.

Pigments for yellow include C. I. Pigment Yellow 1, C. I. Pigment Yellow 2, C. I. Pigment Yellow 3, C. I. Pigment Yellow 12, C. I. Pigment Yellow 13, C. I. Pigment Yellow 14, C. I. Pigment Yellow 16, C. I. Pigment Yellow 17, C. I. Pigment Yellow 73, C. I. Pigment Yellow 74, C. I. Pigment Yellow 75, C. I. Pigment Yellow 83, C. I. Pigment Yellow 93, C. I. Pigment Yellow 95, C. I. Pigment Yellow 97, C. I. Pigment Yellow 98, C. I. Pigment Yellow 114, C. I. Pigment Yellow 128, C. I. Pigment Yellow 129, C. I. Pigment Yellow 151, and C. I. Pigment Yellow 154.

Pigments for magenta include C. I. Pigment Red 5, C. I. Pigment Red 7, C. I. Pigment Red 12, C. I. Pigment Red 48(Ca), C. I. Pigment Red 48(Mn), C. I. Pigment Red 57(Ca), C. I. Pigment Red 57:1, C. I. Pigment Red 112, C. I. Pigment Red 123, C. I. Pigment Red 168, C. I. Pigment Red 184, and C. I. Pigment Red 202.

Pigments for cyan include C. I. Pigment Blue 1, C. I. Pigment Blue 2, C. I. Pigment Blue 3, C. I. Pigment Blue 15:3, C. I. Pigment Blue 15:34, C. I. Pigment Blue 16, C. I. Pigment Blue 22, C. I. Pigment Blue 60, C. I. Vat Blue 4, and C. I. Vat Blue 60.

The content of the resin contained in the colored particles or the content of the resin and shell polymer contained in preferably the core-shell type colored particles in the water-based ink of the invention is preferably 0.5 to 50% by weight, and more preferably 0.5 to 30% by weight based on the water-based ink. When the above content of the resin and/or the polymer in the water-based ink is less than 0.5% by weight, the function to protect a colorant is insufficient, on the other hand, when the above content is over 50% by weight, storage stability of the dispersion as ink may decrease or clogging of the printer head may occur due to ink viscosity increase or coagulation of the dispersion accompanied with ink solvent evaporation at the top portion of a nozzle. Therefore the above range of that content is preferred.

The content of the colorant such as a dye or pigment in the ink is preferably from 1 to 30% by weight, and more preferably from 1.5 to 25% by weight. When the content of the colorant in the is less than 1% by weight, print density is insufficient. When it is over 30% by weight, aging stability of the ink may be reduced due to increase of the particle diameter caused by, for example, coagulation. Therefore, that content falling within the above range is preferred.

The water-based ink of the present invention, utilizing water as a medium, comprises dispersed colored particles containing the above colorant, and various kinds of conventional additives, well known in the art may be optionally added to the ink. Examples of the additives include a wetting agent such as polyhydric alcohols, a dispersant, an inorganic salt, a surfactant, an antiseptic agent, an antifungal agent, a pH adjusting agent, an antifoaming agent of a silicone type, a chelating agent such as EDTA, and an oxygen absorbing agent such as a sulfite.

Examples of the above wetting agent include polyhydric alcohols such as ethylene glycol, propylene glycol, diethylene glycol, triethylene glycol, tetraethylene glycol, polyethylene glycol, glycerin, diethylene glycol diethylether, diethylene glycol mono-n-butylether, ethylene glycol monomethyl ether, ethylene glycol monoethyl ether, ethylene glycol monobutyl ether, methylcarbitol, ethylcarbitol, butylcarbitol, ethylcarbitol acetate, diethylcarbitol, triethylene glycol mono methylether, triethylene glycol monoethyl ether and propylene glycol monomethyl ether; ethers thereof; acetate series; nitrogen-containing compounds such as N-mehtyl-2-pyrolidone, 1,3-dimethylimidazolidinone, triethanolamine, formamide and dimethylformamide; and dimethylsulfoxide. These can be used alone or in combination of two or more kinds. These wetting agents are not specifically limited with respect to the addition amount. The wetting agents can be preferably added to the water-based ink in an amount of preferably from 0.1 to 50% by weight, and more preferably 0.1 to 30% by weight, based on the water-based ink.

In order to maintain ink viscosity stability and improve color reproducibility, inorganic salts may be added to the ink. Examples of the inorganic salts include sodium chloride, sodium sulfate, magnesium chloride, and magnesium sulfide, but the present invention is not limited thereto.

A dispersant or an emulsifying agent is not specifically limited, however, the HLB value thereof is preferably from 8 to 18 in obtaining the dispersing or emulsifying effect or in obtaining the effect to control the increase of particle diameter in a suspension.

As the surfactant, any of a cationic surfactant, an anionic surfactant, an amphoteric surfactant and a non-ionic surfactant can be used.

The emulsifying agent or dispersant is preferably an anionic surfactant or a polymeric surfactant, A surfactant for adjusting a surface tension of the ink is preferably a non-ionic surfactant.

Examples of the cationic surfactant include aliphatic amine salts, aliphatic quaternary ammonium salts, benzalkonium chlorides, benzethonium chloride, pyridinium salts, and imidazolinium salts.

Examples of the anionic surfactant include fatty acid salts, N-acyl-N-methylglycine salt, N-acyl-N-methyl-β-alanine salt, N-acylglutamic acid salt, alkylether carboxylic acid salts, acylated peptides, alkylsulfonic acid salts, alkylbenzene sulfonic acid salts, alkylnaphthalene sulfonic acid salts, dialkylsulfosucccinic acid ester salts, alkylsulfoacetic acid salts, α-olefinesulfonic acid salts, N-acylmethyltaurine, sulfonated oil, higher alcohol sulfuric acid esters, salts of esters of higher alcohol with sulfuric acid, salts of esters of secondary higher alcohol with sulfuric acid, alkylethersulfates, secondary higher alcohol ethoxysulfates, polyoxyethylenealkyl phenyl ether sulfates, fatty acid alkylolamide sulfates, alkyletherphosphates, alkylphosphates.

Examples of the amphoteric surfactant include bataines having an anion from a carboxyl group or a sulfo group, amino carboxylic acid salts, and imidazolinium betaines.

Examples of the nonionic surfactant include polyoxyethylene alkyl ether, polyoxyethylene secondary alkyl ether, polyoxyethylene alkylphenyl ether (for example, Emulgen), polyoxyethylene sterol ether, polyoxyethylene lanoline derivatives, polyoxyethylenepolyoxypropylene alkyl ether (for example, New Pole PE-62), polyoxyethylene glyceride, polyoxyethylene castor oil, hardened castor oil, polyoxyethylene sorbitan fatty acid ester, polyoxyethylene sorbitol fatty acid ester, polyoxyethylene glycol fatty acid ester, monoglycerides, polyglycerides, sorbitan fatty acid ester, propylene glycol fatty acid ester, sucrose fatty acid ester, fatty acid alkanol amide, polyoxyethylene fatty acid amide, polyoxyethylene alkylamine, alkylamine oxides, acetylene glycol, and acetylene alcohol.

Other surfactants include, for example, Dispersant SNB, MS, N, SSL, ST and P (names of the products) manufactured by Kao Corp.

These surfactants may be used singly or as an admixture of two or more kinds thereof. The surfactant is contained in the ink in an amount of from 0.001 to 1.0% by weight based on the total weight of the ink, whereby the surface tension of the ink can be controlled. However, the present invention is not necessarily limited thereto. In order to obtain storage stability of ink for a long term, an antiseptic agent or an antifungal agent may be added to the ink.

As the polymeric surfactant, a water soluble resin described below can be used in providing high ink jetting stability. Preferred examples of the polymeric surfactant include styrene-acrylic acid-alkyl acrylate copolymers, styrene-acrylic acid copolymers, styrene-maleic acid-alkyl acrylate copolymers, styrene-maleic acid copolymers, styrene-methacrylic acid-alkyl acrylate copolymers, styrene-methacrylic acid copolymers, styrene-maleic acid monoester copolymers, vinylnaphthalene-acrylic acid copolymers, and vinylnaphthalene-maleic acid copolymers. Other polymeric surfactants include Joncryl (manufactured by Johnson Co., Ltd.), which is an acryl-styrene type resin. These polymeris surfactants may be used as an admixture of two or more kinds thereof.

The content of the polymeric surfactant in the ink is preferably from 0.01 to 10% by weight, and more preferably from 0.3 to 5% by weight, based on the total weight of the ink. When the content of the surfactant is less than 0.01% by weight, it is difficult to achieve small particle diameter suspension, and when it is over 10% by weight, the particle diameter of the suspension may increase, stability of the suspension may be lowered, or gelation of the suspension may be caused.

Examples of the antiseptic agent or antifungal agent include halogenated aromatic compounds (for example, Preventol CMK, or chloromethylphenol), methylene dithiocyanate, compounds containing halogen, nitrogen, and sulfur, and 1,2-benzisothiazoline-3-on (for example, PROXEL GXL), but the present invention is not limited thereto.

In order to maintain stability of the ink, the PH adjusting agent may be added to the ink. Examples of the PH adjusting agent include hydrochloric acid, acetic acid, citric acid, sodium hydroxide, and potassium hydroxide. These compounds may be used as they are or as an aqueous solution in which they are dissolved in water.

Further, as the antifoaming agent, there is no specific limitation and numerous commercially available products are acceptable. Such commercially available products include, for example, KF 96, 66, 69, KS 68, 604, 607A, 602, 603, KM73, 73A, 73E, 72, 72A, 72C, 72F, 82F, 70, 71, 75, 80, 83A, 85, 89, 90, 68-1F and 68-2F (names of the products) manufactured by Shin-Etsu Silicone Co., Ltd. The blending content of the antifoaming agent is not specifically limited, however, is preferably from 0.001 to 2% by weight based on the water-based ink of the invention. When the content of the antifoaming agent is less than 0.001% by weight, it easily causes foaming at the time of ink preparation, and it is difficult to eliminate small bubbles in the ink, while when it is over 2% by weight, although foaming may be restrained, print quality may be deteriorated by generation of repellency spots or non uniform printing. Therefore, the range as described above is preferred.

Next, an emulsifying method used for manufacturing the ink of the present invention will be explained. Employing various emulsifying methods, colored particles as cores containing a colorant and a resin are prepared or core/shell colored particles are prepared directly from pigment particles and a resin (a polymer), and the water-based ink of the invention can be prepared employing the resulting colored particles. Examples of the emulsifying method are summarized, for example, on p. 86 of "Progress and Application of Functional Emulsifiers and Emulsifying Techniques" published by C. M. C. Co. Ltd. In the present invention, an emulsifying dispersion apparatus, utilizing ultrasonic waves, high speed rotational shear or high pressure, is especially preferably used for preparing colored particles as cores containing a dye and a resin.

In emulsifying dispersion by means of ultrasonic waves, used can be two types, a so-called a batch type and a continuous type. A batch type is suitable for preparation of a relatively small amount of samples and a continuous type for preparation of a large amount of samples. In a continuous type, for example, an apparatus such as UH-600SR (produced by S. M. T. Co., Ltd.) can be used. In such a continuous type, the application time of ultrasonic waves can be determined by (volume of dispersion room)/(flow speed×circulation number). When plural ultrasonic wave application apparatuses are present, it can be determined by totalizing each application time. The application time is practically not longer than 10,000 seconds. When more than 10,000 seconds of the application time are required, load on the process is too great and emulsifying dispersion time has to be practically shortened, for example, by reselecting emulsifiers used. For this reason, more than 10,000 seconds is not necessary. The application time is preferably between 10 to 2,000 seconds.

As an emulsifying dispersion apparatus employing high speed rotational shear, dispermixers such as described on pages 255 and 256, homomixers such as described on page 251 and ultra-mixers such as described on page 256, of "Progress and Application of Functional Emulsifiers and Emulsifying Techniques" published by C. M. C. Publishing Co., Ttd., can be used. These types of apparatuses can be selectively employed depending on the viscosity of the solution at emulsifying dispersion. In the emulsifying dispersion apparatuses employing high speed rotational shear, the rotational number of stirring blades is important. In the case of an apparatus having a stator, since the clearance between the stirring blade and the stator is generally approximately 0.5 mm and can not be made much less, the shear stress is mainly dependent on the circumferential speed of the stirring blade. Those having a circumferential speed of 5 to 150 m/sec can be applicable to emulsifying dispersion in the present invention. When the circumferential speed is too slow, the particle diameter often cannot be made sufficiently small even with prolonged emulsification time, while the motor power has to be extremely strengthened to achieve 150 m/sec. Preferable is a range of 20 to 100 m/sec.

In emulsifying dispersion by means of high pressure, an apparatus such as LAB2000 (produced by S. M. T. Co., Ltd.) can be used, and the emulsifying dispersion ability is dependent on the pressure applied to the sample. The pressure is preferably in the range of $10^4$ kPa to $5 \times 10^5$ kPa. Further, the desired particle diameter can be obtained, if necessary, by repeating emulsifying dispersion a few times. When the pressure is too low, the desired particle diameter often cannot be obtained, while it is not practical to increase the pressure to $5 \times 10^5$ kPa because of excess load on the apparatus. More preferable is a range of $5 \times 10^4$ kPa to $2 \times 10^5$ kPa.

These emulsifying dispersion apparatus can be utilized alone, as well as in combinations if necessary. A colloidal mill or a flow-jet mixer alone cannot achieve the object of the present invention, however, the combination with an apparatus of the present invention can enhance the effect of the present invention by enabling emulsifying dispersion over a short of time.

In an image formation by discharge of a water-based ink for ink-jet recording of the present invention, used may be an on-demand method or a continuous method ink-jet head. Further, for a discharge method, employed may be any of following methods such as an electromechanical transducing method (e.g., single cavity type, double cavity type, bender type, piston type, share mode type, and shared wall type), an electrothermal transducing method (e.g., thermal ink-jet type and bubble jet type).

In an image formation method employing the water-based ink of the invention, an ink-jet recording image can be obtained on an ink jet receiving medium as follows. The method comprises ejecting droplets of the ink through the ink jet head of a printer fed with the ink, based on digital signals, and adhering the ejected ink onto an ink jet receiving medium.

Examples of the ink jet receiving medium that can be used are; any plain paper, coated paper, cast coated paper, glossy paper, glossy film, and OHP film. Among these, a recording medium that forms a porous layer, a so-called void layer, is preferable. The medium is not specifically limited to the above materials or a shape, and for example, a medium having a three-dimensional structure may be used as well as those formed as a sheet.

The water-based ink of the invention can be utilized, for example, as an ink for general writing instruments such as fountain pens, ball-point pens, felt pens, other than as an ink for ink-jet recording. The colored particle aqueous dispersion of the invention can be dried to obtain powder particles, and the powder particles can be used as a toner for electrophotography.

EXAMPLES

The present invention will be explained belwo, based on examples. However, the present invention is not limited to these examples.

Example 1

Synthetic Example 1

Core-Shell Type Dye Colored Particles

Four grams of polyvinyl butyral (3000K, manufactured by Denki Kagaku Co., Ltd., featuring an average polymerization degree of 800), 3 g of C.I. Solvent Yellow 56, and 3 g of C.I. Solvent Yellow 162 were dissolved while stirring in 50 g of ethyl acetate in a separable flask to obtain a solution. Subsequently, 100 g of an aqueous solution containing 0.5 g of sodium lauryl sulfate was added dropwise to the solution and mixed, and the resulting mixture was emulsified by use of an ultra-sonic disperser (UH-150 type), produced by S. M. T. Co., Ltd. for 300 seconds. Thereafter, ethyl acetate was removed under reduced pressure to obtain a colored particle dispersion containing particles impregnated with two kinds of dyes. After the interior of the flask was filled with gaseous nitrogen, 0.06 g of potassium persulfate was added to the dispersion and heated to 80° C. with a heater, and then, a mixture of 2 g of styrene and 1 g of 2-hydroxyethyl methacrylate was added dropwise and reacted for 6 hours to form a polymer shell encapsulating the colored particles. Thus, a core-shell type colored particle dispersion was prepared. The average particle diameter of the core-shell type colored particles was 89 nm. The particle diameter stated here means the volume average particle diameter determined by using a laser particle analyzing system manufactured by OTSUKA ELECTRONICS CO., LTD.

Synthetic Example 2

Core-Shell Type Dye Colored Particles

Five grams of polyvinyl butyral (BL-S, manufactured by Sekisui Chemical Co., Ltd., featuring an average polymerization degree of 350), 5 g of meagenta dye A, and 1 g of Oil Pink 312 manufactured by Orient Kagaku Kogyo Co., Ltd., were dissolved while stirring in 50 g of ethyl acetate in a separable flask to obtain a solution. Subsequently, 100 g of an aqueous solution containing 0.5 g of sodium lauryl sulfate was added dropwise to the solution and mixed, and the resulting mixture was emulsified by use of an ultra-sonic disperser (UH-150 type), produced by S. M. T. Co., Ltd. for 300 seconds. Thereafter, ethyl acetate was removed under reduced pressure to obtain a colored particle dispersion containing particles impregnated with two kinds of dyes. After the interior of the flask was filled with gaseous nitrogen, 0.15 g of potassium persulfate was added to the dispersion and heated to 80° C. with a heater, and then, a mixture of 2 g of styrene, 1 g of 2-hydroxyethyl methacrylate and 0.5 g of 2-ethylhexyl methacrylate was added dropwise and reacted for 7 hours to form a polymer shell encapsulating the colored particles. Thus, a core-shell type colored particle aqueous dispersion was prepared. The average particle diameter of the core-shell type colored particles was 83 nm. The particle diameter stated here means the volume average particle diameter determined by using a laser particle analyzing system manufactured by OTSUKA ELECTRONICS CO. LTD. Magenta dye A

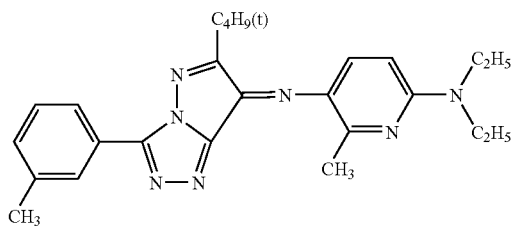

Synthetic Example 3

Core-Shell Type Dye Colored Particles

Five grams of polyvinyl butyral (BL-S, manufactured by Sekisui Chemical Co., Ltd., featuring an average polymerization degree of 350), and 8 g of FS Blue 1504, manufactured by Arimoto Kagaku Kogyo Co., Ltd., were dissolved while stirring in 50 g of ethyl acetate in a separable flask to obtain a solution. Subsequently, 90 g of an aqueous solution containing 0.5 g of sodium lauryl sulfate was added dropwise to the solution and mixed, and the resulting mixture was emulsified by use of an ultra-sonic disperser (UH-150 type), produced by S. M. T. Co., Ltd. for 300 seconds. Thereafter, ethyl acetate was removed under reduced pressure to obtain a colored particle dispersion. After the interior of the flask was filled with gaseous nitrogen, 0.1 g of potassium persulfate was added to the dispersion and heated to 80° C. with a heater, and then, a mixture of 2 g of styrene, 1 g of 2-hydroxyethyl methacrylate and 1 g of 2-ethylhexyl methacrylate was added dropwise and reacted for 6 hours to form a polymer shell encapsulating the colored particles. Thus, a core-shell type colored particle aqueous dispersion was prepared. The average particle diameter of the core-shell type colored particles was 79 nm.

Synthetic Example 4

Core-Shell Type Dye Colored Particles

Seven grams of polyvinyl butyral (BL-S, manufactured by Sekisui Chemical Co., Ltd., featuring an average polymerization degree of 350) and 10 g of Oil Black 860 manufactured by Orient Kagaku Kogyo Co., Ltd. were dissolved while stirring in 50 g of ethyl acetate in a separable flask to obtain a solution. Subsequently, 100 g of an aqueous solution containing 0.5 g of sodium lauryl sulfate was added dropwise to the solution and mixed, and the resulting mixture was emulsified by use of an ultra-sonic disperser (UH-150 type), produced by S. M. T. Co., Ltd. for 300 seconds. Thereafter, ethyl acetate was removed under reduced pressure to obtain a colored particle dispersion containing particles impregnated with two kinds of dyes. After the interior of the flask was filled with gaseous nitrogen, 0.5 g of potassium persulfate was added to the dispersion and heated to 80° C. with a heater, and then, a mixture of 4 g of styrene, 1.5 g of 2-hydroxyethyl methacrylate and 1 g of 2-ethylhexyl methacrylate was added dropwise and reacted for 7 hours to form a polymer shell encapsulating the colored particles. Thus, a core-shell type colored particle aqueous dispersion was prepared. The average particle diameter of the core-shell type colored particles was 86 nm.

Comparative Synthetic Example 1

A comparative colored particle aqueous dispersion was prepared in the same manner as Synthetic Example 1, except that an acrylic acid-2-ethylhexyl methacrylate copolymer was used instead of the polyvinyl butyral. The average particle diameter of the colored particles in the comparative dispersion was 257 nm.

Comparative Synthetic Example 2

A comparative colored particle aqueous dispersion was prepared in the same manner as Synthetic Example 2, except that 6 g of Teracyl Pink 3G manufactured by Nippon Kayaku Co., Ltd. were used as a dye instead of Oil Pink 312. The average particle diameter of the colored particles in the comparative dispersion was 330 nm.

<<Evaluation Test>>

<Test 1> [Dye Colored Particles]

(Preparation of Ink Samples)

Initially, ethylene glycol, glycerin, Sulfinol 465, and water were added to each of the colored particle dispersions prepared above (Synthetic Examples 1 through 4, and Comparative Synthetic Examples 1 and 2) to obtain ink in which the dye content was 2% by weight, the ethylene glycol content was 15% by weight, the glycerin content was 15% by weight, the Sulfinol 465 content was 0.3% by weight, and the rest was water. Then, the resulting ink was filtered through a 2 μm membrane filter to eliminate dust and larger particles. Thus, ink samples 1 through 6 were obtained. In order to evaluate dispersion stability and storage stability of each ink sample, the ink sample was evaluated for rate of particle diameter variation and filtration property.

(Rate of Particle Diameter Variation)

Each ink sample obtained above was stored at 60° C. for one week. The rate of particle diameter variation was determined by the following formula:

Rate of particle diameter variation (%)=(Particle diameter after storage/Particle diameter before storage)×100

(Filtration Property)

After each ink sample was stored at 60° C. for one week, 5 ml of the sample was filtrated through a 0.8 um cellulose acetate membrane filter and the filtration property was graded as follows:

A (good level): The whole volume could be filtered.

B (permissible level): Not less than a half of the volume could be filtered.

C (impermissible level): Less than half of the volume could be filtered.

Further, each ink sample was printed onto Konica Photojet Paper, Photolike QP Glossy Paper (manufactured by Konica Corporation) using an ink-jet printer (PM-800) manufactured by EPSON Co., Ltd., and ink jetting stability and the maximum density of the printed ink image were evaluated. The results are shown in Table 1.

(Ink Jetting Stability)

Each ink sample was continuously ejected from the nozzles of the ink-jet printer and ink jetting stability was graded as follows:

A (permissible level): Nozzle clogging did not occur over 10 minutes.

B (impermissible level): Nozzle clogging occurred in less than 10 minutes.

(Maximum Density)

The maximum density of the printed ink image was measured through X-Rite 900 (manufactured by Nippon Heihan Kizai Co., Ltd.

the solution and mixed, and the resulting mixture was emulsified for 300 seconds by use of Clear Mix W Motion CLM-0.8W (manufactured by M Technique Co., Ltd.). Thereafter, methyl ethyl ketone was removed under reduced pressure to obtain a colored particle dispersion containing particles impregnated with the dye. After the interior of the flask was filled with gaseous nitrogen, 0.15 g of potassium persulfate was added to the dispersion, and heated to 80° C. with a heater, and then, 5 g of a monomer mixture as shown in Table 2 were added dropwise and reacted for 7 hours to form a polymer shell encapsulating the colored particles. Thus, core-shell type colored particle aqueous dispersions were prepared.

Initially, ethylene glycol, glycerin, Sulfinol 465, and water were added to each of the colored particle aqueous dispersions prepared above (Synthetic Examples 5, 6 and 7 and Comparative Synthetic Examples 3 and 4) to obtain ink in

TABLE 1

| Ink sample No. | Colored particles | Difference in SP between resin and dye | Rate of particle diameter variation (%) | Filtration property | Ink jetting stability | Maximum density | Remarks |
|---|---|---|---|---|---|---|---|
| 1 | Synthetic Example 1 | 2.6 | 111 | A | A | 1.6 | Inv. |
| 2 | Synthetic Example 1 | 0.8 | 115 | A | A | 2.1 | Inv. |
| 3 | Synthetic Example 1 | 2 | 113 | A | A | 2 | Inv. |
| 4 | Synthetic Example 1 | 2.9 | 136 | B | A | 1.7 | Inv. |
| 5 | Comparative Synthetic Example 1 | 4.3 | 370 | C | B | 0.7 | Comp. |
| 6 | Comparative Synthetic Example 2 | 7.6 | Precipitated | C | B | — | Comp. |

Inv.: Invention,
Comp.: Comparative

As is apparent from Table 1 above, inventive ink samples 1 through 4 employing the colored particle aqueous dispersion of the invention provide reduced rate of particle diameter variation, excellent filtration property, excellent dispersion stability and high storage stability. In contrast, comparative ink samples 5 and 6 provide high rate of particle diameter variation, or cause precipitates, resulting in poor stability.

Further, in the tests employing the printer, the inventive ink samples provide excellent ink jetting property and an image with high maximum density, but comparative ink samples provide poor ink jetting property and an image with lower maximum density.

Example 2

Synthetic Examples 5 Through 7 and Comparative Synthetic Examples 3 and 4

Core-Shell Type Dye Colored Particles

Five grams of the resin as shown in Table 2 and 5 g of the dye as shown in Table 2 were dissolved while stirring in 50 g of methyl ethyl ketone in a separable flask to obtain a solution. Subsequently, 100 g of an aqueous solution containing 0.5 g of sodium lauryl sulfate was added dropwise to which the dye content was 2% by weight, the ethylene glycol content was 15% by weight, the glycerin content was 15% by weight, the Sulfinol 465 content was 0.3% by weight, and the rest was water. Then, the resulting ink was filtrated through a 2 μm membrane filter to eliminate dust and larger particles. Thus, ink samples 7 through 11 were obtained.

Each ink sample was evaluated for dispersion stability according to the following procedures:

(Rate of Particle Diameter Variation)

Each ink sample obtained above was stored at 60° C. for ten days. The rate of particle diameter variation was calculated employing the formula described above, and the dispersion stability was evaluated according to the following criteria:

5: The rate of particle diameter variation was less than 15%.

4: The rate of particle diameter variation was from 15% to less than 30%.

3: The rate of particle diameter variation was 30% or more.

2: Approximately half of the particles was coagulated.

1: The entire particles were completely coagulated.

The results are shown in Table 2.

TABLE 2

| Ink sample No. | Colored particles | Resin used | Monomer mixture used | Dye used | *1 | *2 | Dispersion stability | Remarks |
|---|---|---|---|---|---|---|---|---|
| 7 | Synthetic Example 5 | BLS | ST/EHA/HEMA = 10/5/5 | FS Blue 1504 | 5 | 1.3 | 5 | Inv. |
| 8 | Synthetic Example 6 | BLS | ST/HEMA = 7/3 | Oil Black 860 | 9.7 | 1.2 | 4 | Inv. |
| 9 | Synthetic Example 7 | BLS | MMA/HEMA = 9/1 | FS Blue 1504 | 5 | 0.3 | 3 | Inv. |
| 10 | Comparative Synthetic Example 5 | BLS | ST/HEMA = 7/3 | Terasil Pink 3G | 0.3 | 1.2 | 2 | Comp. |
| 11 | Comparative Synthetic Example 5 | BLS | MMA/HEMA = 9/1 | Terasil Pink 3G | 0.3 | 0.3 | 1 | Comp. |

*1: log P of the dye-log P of the core resin
*2: log P of the shell polymer-log P of the core resin
ST: Styrene, EHA: 2-ethylhexyl acrylate, HEMA: 2-hydroxyethyl methacrylate, MMA: methyl methacrylate,
Inv.: Invention,
Comp: Comparative As is apparent from Table 2 above, the inventive ink samples provide high dispersion stability.

EFFECTS OF THE INVENTION

The present invention provides a water-based ink for ink-jet printing providing high storage stability, high ink jetting stability, and a high printing image density, and further provides a colored particle aqueous dispersion with high stability for preparing the water-based ink. Another object of the present invention is to provide an image forming method employing the water-based ink for ink-jet printing.

What is claimed is:

1. A colored particle aqueous dispersion containing colored particles comprising a colorant and a resin, wherein the difference in solubility parameter (SP) between the colorant and the resin is not more than 4.0 $(J/cm^3)^{1/2}$, and wherein the colored particles are core/shell colored particles in which the colorant and the resin form a core, and a shell polymer encapsulates the core, and the colorant is a dye wherein log P of the dye is not less than 2.0 higher than log P of the resin or the shell polymer, the log P being defined by the following formula:

log P=log $So/Sw$ wherein So represents solubility in 25° C. n-octanol of material to be measured, and SW represents solubility in 25° C. water of material to be measured.

2. The colored particle aqueous dispersion of claim 1, wherein log P of the dye is 2.0 to 15 higher than log P of the resin or the shell polymer.

3. The colored particle aqueous dispersion of claim 2, wherein log P of the dye is 2.0 to 10 higher than log P of the resin or the shell polymer.

4. The colored particle aqueous dispersion of claim 1, wherein log P of the shell polymer is not less than 1.0 higher than log P of the resin, the log P being defined by the following formula:

log P=log $So/Sw$ wherein So represents solubility in 25° C. n-octanol of material to be measured, and Sw represents solubility in 25° C. water of material to be measured.

5. The colored particle aqueous dispersion of claim 4, wherein log P of the shell polymer is 1.0 to less than 5.0 higher than log P of the resin.

6. The colored particle aqueous dispersion of claim 5, wherein log P of the shell polymer is 1.0 to 3.0 higher than log P of the resin.

7. A water-based ink containing a colored particle aqueous dispersion, wherein the dispersion contains colored particles comprising a colorant and a resin, and wherein the difference in solubility parameter (SP) between the colorant and the resin is not more than 4.0 $(J/cm^3)^{1/2}$, and wherein the colored, particles are core/shell colored particles in which the colorant and the resin form a core, and a shell polymer encapsulates the core, and the colorant is a dye wherein log P of the dye is not less than 2.0 higher than log P of the resin or the shell polymer, the log P being defined by the following formula:

log P=log $So/Sw$ wherein So represents solubility in 25° C. n-octanol of material to be measured, and Sw represents solubility in 25° C. water of material to be measured.

8. The water-based ink of claim 7, wherein log P of the dye is 2.0 to 15 higher than log P of the resin or the shell polymer.

9. The water-based ink of claim 8, wherein log P of the dye is 2.0 to 10 higher than log P of the resin or the shell polymer.

10. The water-based ink of claim 7, wherein log P of the shell polymer is not less than 1.0 higher than log P of the resin, the log P being defined by the following formula:

log P=log $So/Sw$ wherein So represents solubility in 25° C. n-octanol of material to be measured, and Sw represents solubility in 25° C. water of material to be measured.

11. The water-based ink of claim 10, wherein log P of the shell polymer is 1.0 to less than 5.0 higher than log P of the resin.

12. The water-based ink of claim 11, wherein log P of the shell polymer is 1.0 to 3.0 higher than log P of the resin.

13. The water-based ink of claim 7, wherein the colored particles have an average particle diameter of not more than 100 nm.

14. The water-based ink of claim 7, wherein the water-based ink is ink for ink jet printing.

15. An image formation method comprising the steps of ejecting droplets of a water-based ink from an ink-jet head based on digital signals, and adhering the ejected droplets onto an ink receiving material, the water based ink containing a colored particle aqueous dispersion containing colored particles comprising a colorant and a resin, wherein the difference in solubility parameter (SP) between the colorant and the resin is not more than 4.0 $(J/cm^3)^{1/2}$, and wherein the colored particles are core/shell colored particles in which the colorant and the resin form a core, and a shell polymer encapsulates the core, and the colorant is a dye wherein log P of the dye is not less than 2.0 higher than log P of the resin or the shell polymer, the log P being defined by the following formula:

$$\log P = \log So/Sw$$

wherein So represents solubility in 25° C. noctanol of material to be measured, and Sw represents solubility in 25° C. water of material to be measured.

* * * * *